(12) United States Patent
Jeol et al.

(10) Patent No.: US 11,708,490 B2
(45) Date of Patent: Jul. 25, 2023

(54) COMPATIBILIZED POLYMER COMPOSITION COMPRISING A POLYAMIDE

(71) Applicant: SOLVAY SPECIALTY POLYMERS USA, LLC, Alpharetta, GA (US)

(72) Inventors: Stéphane Jeol, Saint-Genis Laval (FR); Narmandakh Taylor, Pingree Grove, IL (US); Kelly D. Branham, Woodstock, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 189 days.

(21) Appl. No.: 17/053,074

(22) PCT Filed: Apr. 29, 2019

(86) PCT No.: PCT/EP2019/060972
§ 371 (c)(1),
(2) Date: Nov. 5, 2020

(87) PCT Pub. No.: WO2019/219368
PCT Pub. Date: Nov. 21, 2019

(65) Prior Publication Data
US 2021/0070996 A1 Mar. 11, 2021

Related U.S. Application Data

(60) Provisional application No. 62/673,272, filed on May 18, 2018.

(30) Foreign Application Priority Data
Jul. 9, 2018 (EP) .................................. 18182460

(51) Int. Cl.
*C08L 77/06* (2006.01)
*C08L 79/08* (2006.01)
*C08L 81/02* (2006.01)
*C08L 81/04* (2006.01)
*C08L 81/06* (2006.01)

(52) U.S. Cl.
CPC ............... *C08L 77/06* (2013.01); *C08L 79/08* (2013.01); *C08L 81/02* (2013.01); *C08L 81/04* (2013.01); *C08L 81/06* (2013.01); *C08L 2203/16* (2013.01); *C08L 2203/20* (2013.01); *C08L 2205/03* (2013.01); *C08L 2205/08* (2013.01)

(58) Field of Classification Search
CPC combination set(s) only.
See application file for complete search history.

(56) References Cited

U.S. PATENT DOCUMENTS 5,422,398 A 6/1995 Weiss
2016/0068679 A1* 3/2016 Desbois ................ C08G 69/18
525/535
2019/0168450 A1 6/2019 Gabriel et al.

FOREIGN PATENT DOCUMENTS

| EP | 0185237 A1 * | 6/1986 |
| EP | 495457 A2 | 7/1992 |
| JP | 06041432 A | 2/1994 |
| JP | 2014040528 A1 | 2/2014 |
| WO | 2018019730 A1 | 2/2018 |

OTHER PUBLICATIONS

EP 0185237 A1 machine translation (Jun. 1986).*
Murphy J., in "Additives for Plastics Handbook", 2nd Edition, 2001, Chapter 5.2.3., p. 43-48—Elsevier Advanced Technology.

* cited by examiner

*Primary Examiner* — Ana L. Woodward
(74) *Attorney, Agent, or Firm* — Osha Bergman Watanabe & Burton LLP (57) ABSTRACT

The present invention relates to a polymer composition (C) comprising at least one polyamide (P1), and from 1 to 50 wt. %, based on the total weight of (C), of at least one functionalized polymer (P2), wherein P2 is a poly(aryl ether sulfone) (PAES) having at least one functional group $(SO_3^-)$, $(M^{p+})_{1/p}$ in which $M^{p+}$ is a metal cation of p valence. The present invention also relates to articles incorporating the polymer composition (C) and the use of functionalized polymer (P2) as a compatibilizer in the polymer composition (C) comprising two immiscible polymers.

12 Claims, 1 Drawing Sheet

COMPATIBILIZED POLYMER COMPOSITION COMPRISING A POLYAMIDE

TECHNICAL FIELD CROSS-REFERENCE TO RELATED APPLICATIONS

This application is a U.S. national stage entry under 35 U.S.C. § 371 of International Application No. PCT/EP2019/060972 filed Apr. 29, 2019, which claims priority to U.S. provisional application 62/673,272, filed on May 18, 2018 and to European patent application EP 18182460.8, filed on Jul. 9, 2018, the whole content of each of these applications being incorporated herein by reference for all purposes.

TECHNICAL FIELD

The present invention relates to a polymer composition (C) comprising at least one polyamide (P1), and from 1 to 50 wt. %, based on the total weight of (C), of at least one functionalized polymer (P2), wherein P2 is a poly(aryl ether sulfone) (PAES) having at least one functional group $(SO_3^-)$, $(M^{p+})_{1/p}$ in which $M^{p+}$ is a metal cation of p valence. The present invention also relates to articles incorporating the polymer composition (C) and the use of functionalized polymer (P2) as a compatibilizer in the polymer composition (C) comprising two immiscible polymers.

BACKGROUND ART

Polymer compositions are commonly used to manufacture articles for the automotive, electrical and electronic industries, for example as engine parts and electronic parts. Submitted to high temperatures, these articles have to present good mechanical properties at elevated temperatures of use, for example above 150° C. In the automotive market, in order to improve the fuel efficiency, car manufacturers are looking for solutions to reduce the weight of the cars. One approach consists in replacing metal parts by polymers. For under-the-hood technical parts, the polymers must have a high modulus and strength at the service temperature which is generally higher than 150° C. Most of the engineering polymers (e.g. polyamides) however have a glass transition temperature Tg lower than 150° C., which means a modulus at service temperature lower than at room temperature. Parts with a higher thickness are therefore produced in order to compensate the loss in modulus and strength at elevated temperature, but this then tends to limit the desired weight reduction.

Polymers may be blended in order to achieve new compositions with desirable mechanical properties and heat resistance. However, several high performance polymers are immiscible with each other, which often results in heterogeneous multi-phase compositions. These compositions may then exhibit several thermal transition temperatures (Tg, Tm), usually exhibit poor mechanical properties, and suffer from delamination and/or aesthetical defects. Mechanical properties notably depend of the degree of compatibility of the polymers and the size domains created between the continuous phase and the dispersed phase.

There is a need for new blends of polymers having increased compatibility, thereby presenting good mechanical properties such as high modulus and strength at elevated temperatures of use, for example above 150° C.

There is also a need for new blends of polymers not only having good mechanical properties at elevated temperatures, but also a satisfactory surface aspect and a low water absorption over time to improve the dimensional stability of the parts.

BRIEF DESCRIPTION OF THE FIGURES

FIG. 1 shows transmission electron microscopy (TEM) micrographs of the compositions of Comparative Example 1 (FIG. 1A) and Example 1 (FIG. 1B).

DISCLOSURE OF THE INVENTION

Poly(aryl ether sulfone) (PAES), polyphenylene sulfide (PPS) and polyetherimide (PEI) polymers are generally immiscible with polyamides (P1). When these polymers are blended, domains of an average size of more than 1.0 μm, for example more than 1.25 μm or even more than 1.5 μm can be observed under microscope, which results in a polymeric blend with poor mechanical properties, suffering from delamination and/or aesthetical defects.

The present invention relates to a compatibilized polymer composition (C) comprising at least one polyamide (P1) and at least one polymer (P2, optionally with P3) wherein P2 is a poly(aryl ether sulfone) (PAES), which does not suffer from the drawbacks of the polymeric blend mentioned above.

The composition of the present invention more precisely comprises, as an essential component, a functionalized polymer with a PAESbackbone, bearing at least one functional group $(SO_3^-)$, $(M^{p+})_{1/p}$ in which $M^{p+}$ is a metal cation of p valence.

The applicant has found that such composition not only present domains of an average size of less than 1.0 μm, as measured under transmission electron microscopy (TEM), but also provides an effective, cost-effective solution to the above-stated technical constraints required by the automotive, electrical or electronic markets: high modulus and strength at elevated temperature, mechanical properties, low water absorption, surface aspect.

Polyamide (P1)

The polymer composition (C) comprises at least one polyamide (P1).

According to the present invention, a polyamide (P1) denotes any polymer comprising at least 50 mol. % of recurring units (RPA) including at least one amide group (—C(═O)N(H)—). In some embodiments, the polyamide (P1) comprises at least 60 mol. %, at least 70 mol. %, at least 80 mol. %, at least 90 mol. %, at least 95 mol. %, at least about 99 mol. %, or 100 mol. % of recurring units (RPA).

The polyamide (P1) of the present invention can be prepared by any conventional method, for example, by polymerization polycondensation of polyamide monomers in the melt or in solution, for instance in water.

According to one embodiment, P1 is the polymerization product of lactam or aminoacids having the structure $NH_2$—$(CH_2)_n$—COOH where n varies from 3 to 12, preferentially n=5, n=10, n=11 (respectively PA6, PA11, PA12).

According to another embodiment of the present invention, P1 is the condensation product of the mixture comprising:
- at least one diacid (DA) (or derivatives thereof) and
- at least one diamine (NN) (or derivatives thereof).

P1 may for example be the condensation product of the mixture comprising one or more diacids (DA) and one or more diamines (NN). P1 can also combine recurring units deriving from the polymerization of lactams or aminoacids as described above, as well as recurring units deriving from the condensation of at least one diacid and one diamine.

According to the present invention, the diacid (DA) can be chosen among a large variety of aliphatic or aromatic components comprising at least two acidic moieties —COOH and can notably comprise heteroatoms (e.g. O, N or S). According to this embodiment, the diamine (NN) can be chosen among a large variety of aliphatic or aromatic components comprising at least two amine moieties —NH2 and can notably comprise heteroatoms (e.g. O, N or S).

According to a first embodiment, the recurring units (RPA) of polymer P1 are according to formula (PA1):

(PA1)

wherein:
each $R_i$, $R_j$, $R_k$, and $R_l$ on each carbon atom is independently selected from the group consisting of hydrogen, halogen, alkyl, alkenyl, ether, thioether, ester, amide, imide, alkali or alkaline earth metal sulfonate, alkyl sulfonate, alkali or alkaline earth metal phosphonate, alkyl phosphonate, amine, quaternary ammonium, and any combination thereof;
m is an integer from 4 to 10;
n is an integer from 4 to 12.

According to the first embodiment, P1 may for example be the condensation product of the mixture comprising:
at least one aliphatic diacid ($DA_{al}$) or derivative thereof, and
at least one aliphatic diamine ($NN_{al}$) or derivative thereof.

According to a second embodiment, P1 is the condensation product of the mixture comprising:
at least one aliphatic diacid ($DA_{al}$) or derivative thereof, and
at least one aromatic diamine ($NN_{ar}$) or derivative thereof.

According to a third embodiment, P1 is the condensation product of the mixture comprising:
at least one aromatic diacid ($DA_{ar}$), or derivative thereof, and
at least one aliphatic diamine ($NN_{al}$), or derivative thereof.

Non limitative examples of aromatic diamines ($NN_{ar}$) are notably m-phenylene diamine (MPD), p-phenylene diamine (PPD), 3,4'-diaminodiphenyl ether (3,4'-ODA), 4,4'-diaminodiphenyl ether (4,4'-ODA) p-xylylene diamine (PXDA) and m-xylylenediamine (MXDA).

Non limitative examples of aliphatic diacids ($DA_{al}$) are notably oxalic acid (HOOC—COOH), malonic acid (HOOC—CH$_2$—COOH), succinic acid [HOOC—(CH$_2$)$_2$—OOCH], glutaric acid [HOOC—(CH$_2$)$_3$—OOCH], 2,2-dimethyl-glutaric acid [HOOC—C(CH$_3$)$_2$—(CH$_2$)$_2$—OOCH], adipic acid [HOOC—(CH$_2$)$_4$—OOCH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—OOCH], azelaic acid [HOOC—(CH$_2$)$_7$—OOCH], sebacic acid [HOOC—(CH$_2$)$_8$—OOCH], undecanedioic acid [HOOC—(CH$_2$)$_9$—OOCH], dodecandioic acid [HOOC—(CH$_2$)$_{10}$—OOCH], tetradecandioic acid [HOOC—(CH$_2$)$_{11}$—OOCH], 1,4 cyclohexanedicarboxylic acid and 1,3 cyclohexanedicarboxylic acid. The aliphatic diacid is preferably adipic acid.

The aliphatic diacids can be used in the polycondensation reaction under their acid form or as acid halogenides, especially chlorides, acid anhydrides, acid salts, acid amides, alkyl ester.

Non limitative examples of aliphatic diamines ($NN_{al}$) are notably 1,2-diaminoethane, 1,2-diaminopropane, propylene-1,3-diamine, 1,3-diaminobutane, 1,4-diaminobutane (putrescine), 1,5-diaminopentane (cadaverine), 2-methyl-1,5-diaminopentane, hexamethylenediamine, 3-methylhexamethylenediamine, 2,5 dimethylhexamethylenediamine, 2,2,4-trimethyl-hexamethylenediamine, 2,4,4-trimethyl-hexamethylenediamine, 1,7-diaminoheptane, 1,8-diaminooctane, 2,2,7,7-tetramethyloctamethylenediamine, 1,9-diaminononane, 5-methyl-1,9-diaminononane, 1,10-diaminodecane, 1,11-diaminoundecane, 1,12-diaminododecane and N,N-Bis(3-aminopropyl)methylamine.

The aliphatic diamines ($NN_{al}$) can also be selected in the group of the polyetherdiamines. The polyetherdiamines can be based on an ethoxylated (EO) backbone and/or on a propoxylated (PO) backbone and they can be ethylene-oxide terminated, propylene-oxide terminated or butylene-oxide terminated diamines. Such polyetherdiamines are for example commercialized under the tradenames Jeffamine® and Elastamine® (Hunstman). A specific example of such a polyetherdiamine is the diamine of formula H$_2$N—(CH$_2$)$_3$—O—(CH$_2$)$_2$—O—(CH$_2$)$_3$—NH$_2$.

Non limitative examples of aromatic diacids ($DA_{ar}$) are notably phthalic acids, including isophthalic acid (IPA), terephthalic acid (TPA), naphthalendicarboxylic acids (e.g. naphthalene-2,6-dicarboxylic acid), 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene. The aromatic diacid is preferably isophthalic acid and/or terephthalic acid.

According to an embodiment, the molar ratio $n_{diacid}/n_{diamine}$ ranges from 0.8 to 1.2. In the context of the present invention, the term "$n_{diacid}$" means total number of moles of diacid species e.g. involved in the condensation process. Similarly, the term "$n_{diamine}$" means total number of moles of diamine species e.g. involved in the condensation process. According to the present invention, the molar ratio $n_{diacid}/n_{diamine}$ may range between 0.85 and 1.15, between 0.9 and 1.1, between 0.95 and 1.05 or between 0.98 and 1.02.

According to an embodiment, when P1 is semicrystalline, P1 has a melting point of at least about 260° C., as measured according to ASTM D3418. According to this embodiment, P1 may have for example a melting point of at least about 270° C., at least about 280° C. or at least about 290° C.

According to a preferred embodiment, P1 is the condensation product of a mixture comprising:
at least one diamine (NN) selected from the group consisting of 1,4-diaminobutane, 1,5-diamonopentane, 1,6-diaminohexane, 1,10-diaminedecane, H$_2$N—(CH$_2$)$_3$—O—(CH$_2$)$_2$—O(CH$_2$)$_3$—NH$_2$ and m-xylylene diamine, and
at least one diacid (DA) selected from the group consisting of adipic acid, sebacic acid, isophthalic acid, terephthalic acid, 5-hydroxyisophthalic acid and 5-sulfophthalic acid.

One or more end capping agents can be used and added to the condensation mixtures above described. The capping agent can for example be selected from the group consisting of an acid comprising only one carboxylic function and an amine comprising only one amine function. Examples of end capping agents are acetic acid, propanoic acid, benzoic acid, benzylamine, 1-aminohexane and 1-aminododecane.

P1 is preferably an aromatic polyamide (PPA) comprising recurring units, for example at least 50 mol. %, resulting from the condensation of:
- at least one phthalic acid, selected from the group consisting of isophthalic acid (IPA), terephthalic acid (TPA) and phthalic acid (PA), or derivative thereof, and
- at least one aliphatic diamine (NN).

Chemical structures of IPA, TPA, PA are depicted herein below:

Suitable polyphthalamides are commercially available under the tradename AMODEL® polyphthalamides from Solvay Specialty Polymers USA, LLC.

Functionalized Polymer (P2)

According to the present invention, the composition (C) comprises from 1 to 50 wt. % of at least one functionalized polymer (P2).

The functionalized polymer (P2) according to the present invention may be an oligomer or polymer, and has at least one functional group, preferably several functional groups. Functional groups can be incorporated by copolymerizing a functional monomer during polymerization of the polymer backbone or by grafting of a pre-formed polymer backbone.

The polymer P2 is in the form of a salt of sulfonic acid and optionally as well carboxylic acid, more precisely a sulfonate —$SO_3^-$ and optionally as well a carboxylate —$COO^-$, and may comprise one or several functional groups:

—($SO_3^-$), ($M^{p+}$)$_{1/p}$ and optionally ($COO^-$), ($M^{p+}$)$_{1/p}$, wherein $M^{p+}$ is a metal cation of p valence.

According to an embodiment, M is selected from the group consisting of sodium, potassium, calcium, lithium, magnesium, silver, aluminum, zinc, nickel, copper, palladium, iron, and cesium. Preferably M is sodium or potassium.

M can alternatively be specifically chosen among alkali metals (IA of the periodic table) or alkaline earths metal (IIA of the periodic table).

According to an embodiment, the functional group(s) of P2 is(are) selected from:
- a sodium salt of sulfonic acid and optionally carboxylic acid, and/or
- a potassium salt of sulfonic acid and optionally carboxylic acid.

The functionalized polymer P2 is a poly(aryl ether sulfone) (PAES). The composition may also comprise functionalized polyphenylene sulfide (PPS) and/or polyetherimide (PEI) polymers. In other words, according to the present invention, P2 is a functionalized poly(aryl ether sulfone) (PAES), and the composition may also comprise functionalized polyphenylene sulfide (PPS) and/or functionalized polyetherimide (PEI).

The functionalized polymer (P2) according to the present invention presents at least one functional group, preferably several functional groups on the polymer backbone, such functional groups being incorporated by copolymerizing a functional monomer during polymerization of the polymer backbone (PAES) or by grafting of a pre-formed polymer backbone (PAES).

Optional Polymer (P3)

According to a preferred embodiment of the present invention, the composition (C) further comprises at least one polymer (P3) selected from the group consisting of poly(aryl ether sulfone) (PAES), a polyarylene sulphide (PAS), a polyetherimide (PEI).

A detailed description of poly(aryl ether sulfone) (PAES), polyphenylene sulfide (PPS) and polyetherimide (PEI) polymers is given below. These definitions do apply equally to functionalized polymer (P2) of the present invention, as well as to the optional polymer (P3).

Poly(Aryl Ether Sulfone) (PAES)

For the purpose of the present invention, a "poly(aryl ether sulfone) (PAES)" denotes any polymer comprising recurring units ($R_{PAES}$) of formula (K):

wherein:
- R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
- h, for each R, is independently zero or an integer ranging from 1 to 4; and
- T is selected from the group consisting of a bond and a group —C(Rj)(Rk)-, where Rj and Rk, equal to or different from each other, are selected from a hydrogen, a halogen, an alkyl, an alkenyl, an alkynyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium.

According to an embodiment, Rj and Rk are methyl groups.

According to an embodiment, h is zero for each R. In other words, according to this embodiment, the recurring units ($R_{PAES}$) are units of formula (K'):

(K')

According to an embodiment of the present invention, at least 50 mol. %, based on the total number of moles in the PAES, at least 60 mol. %, at least 70 mol. %, at least 80 mol. %, at least 90 mol. %, at least 95 mol. %, at least 99 mol. % or all of the recurring units in the PAES are recurring units ($R_{PAES}$) of formula (K) or formula (K').

According to an embodiment, the PAES has a Tg ranging from 160° C. to 250° C., preferably from 170° C. to 240° C., more preferably from 180° C. to 230° C., as measured by differential scanning calorimetry (DSC) according to ASTM D3418.

According to an embodiment, the poly(aryl ether sulfone) (PAES) is selected from the group consisting of a poly (biphenyl ether sulfone) (PPSU), a polyethersulfone (PES) or a polysulfone (PSU).

According to an embodiment, the poly(aryl ether sulfone) (PAES) is a poly(biphenyl ether sulfone) (PPSU).

A poly(biphenyl ether sulfone) polymer is a polyarylene ether sulfone which comprises a biphenyl moiety. Poly (biphenyl ether sulfone) is also known as polyphenyl sulfone (PPSU) and for example results from the condensation of 4,4'-dihydroxybiphenyl (biphenol) and 4,4'-dichlorodiphenyl sulfone.

For the purpose of the present invention, a poly(biphenyl ether sulfone) (PPSU) denotes any polymer comprising recurring units ($R_{PPSU}$) of formula (L):

(L)

Wherein:

R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

h, for each R, is independently zero or an integer ranging from 1 to 4.

According to an embodiment, R is, at each location in formula (L) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to an embodiment, h is zero for each R. In other words, according to this embodiment, the recurring units ($R_{PPSU}$) are units of formula (L'):

(L')

According to another embodiment, the recurring units ($R_{PPSU}$) are units of formula (L"):

(L")

The PPSU polymer of the present invention can therefore be a homopolymer or a copolymer. If it is a copolymer, it can be a random, alternate or block copolymer.

According to an embodiment of the present invention, at least 50 mol. %, at least 60 mol. %, at least 70 mol. %, at least 80 mol. %, at least 90 mol. %, at least 95 mol. %, at least 99 mol. % or all of the recurring units in the PPSU are recurring units ($R_{PPSU}$) of formula (L), (L') and/or (L").

When the poly(biphenyl ether sulfone) (PPSU) is a copolymer, it can be made of recurring units ($R^*_{PPSU}$), different from recurring units ($R_{PPSU}$), such as recurring units of formula (M), (N") and/or (O):

The poly(biphenyl ether sulfone) (PPSU) can also be a blend of a PPSU homopolymer and at least one PPSU copolymer, as described above.

PPSU is commercially available as Radel® PPSU from Solvay Specialty Polymers USA, L.L.C.

According to an embodiment, the poly(aryl ether sulfone) (PAES) is a polysulfone (PSU) polymer.

For the purpose of the present invention, a polysulfone (PSU) denotes any polymer comprising recurring units ($R_{PSU}$) of formula (N):

(N)

wherein:
R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
h, for each R, is independently zero or an integer ranging from 1 to 4.

According to an embodiment, R is, at each location in formula (N) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to an embodiment, h is zero for each R. In other words, according to this embodiment, the recurring units ($R_{PSU}$) are units of formula (N'):

(N')

According to an embodiment of the present invention, at least 50 mol. %, based on the total number of moles in the PSU, at least 60 mol. % (based on the total number of moles in the polymer), at least 70 mol. %, at least 80 mol. %, at least 90 mol. %, at least 95 mol. %, at least 99 mol. % or all of the recurring units in the PSU are recurring units ($R_{PSU}$) of formula (N) and/or (N').

According to another embodiment, a polysulfone (PSU) denotes any polymer of which more at least 50 mol. % of the recurring units are recurring units ($R_{PSU}$) of formula (N"):

(N")

the mol. % being based on the total number of moles in the polymer.

According to an embodiment of the present invention, at least 60 mol. %, at least 70 mol. %, at least 80 mol. %, at least 90 mol. %, at least 95 mol. %, at least 99 mol. % or all of the recurring units in the PSU are recurring units ($R_{PSU}$) of formula (N").

The PSU polymer of the present invention can therefore be a homopolymer or a copolymer. If it is a copolymer, it can be a random, alternate or block copolymer.

When the polysulfone (PSU) is a copolymer, it can be made of recurring units ($R^*_{PSU}$), different from recurring units ($R_{PSU}$), such as recurring units of formula (L"), (M) and/or (O) above described.

The polysulfone (PSU) can also be a blend of a PSU homopolymer and at least one PSU copolymer, as described above.

PSU is available as Udel® PSU from Solvay Specialty Polymers USA, L.L.C.

According to an embodiment, the poly(aryl ether sulfone) (PAES) is a polyethersulfone (PES) polymer.

As used herein, a "polyethersulfone (PES)" denotes any polymer comprising recurring units ($R_{PES}$) of formula (O):

(O)

According to an embodiment, at least 50 mol. %, based on the total number of moles in the PES, at least 60 mol. %, 70 mol. %, 80 mol. %, 90 mol. %, 95 mol. %, 99 mol. %, and most preferably all of the recurring units in the PES are recurring units of formula (O).

PES is available as Veradel® PESU from Solvay Specialty Polymers USA, L.L.C.

Polyphenylene Sulfide Polymer (PPS)

According to the present invention, a "polyphenylene sulfide polymer (PPS)" denotes any polymer comprising recurring units ($R_{PPS}$) of formula (Q) (mol. % are herein based on the total number of moles in the PPS polymer):

(Q)

wherein $R^1$, $R^2$, $R^3$, and $R^4$ independently can be hydrogen or a substituent, selected from the group consisting of halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups.

According to an embodiment of the present invention, at least 50 mol. %, at least 60 mol. %, at least 70 mol. %, at least 80 mol. %, at least 90 mol. %, at least 95 mol. %, at least 99 mol. % of the recurring units in the PPS are recurring units ($R_{PPS}$) of formula (L).

According to an embodiment of the present invention, the polyphenylene sulfide polymer denotes any polymer of which at least 50 mol. % of the recurring units are recurring units ($R_{PPS}$) of formula (L) wherein $R^1$, $R^2$, $R^3$, and $R^4$ are hydrogen atoms. For example, the PPS polymer is such that at least about 60 mol. %, based on the total number of moles in the PPS polymer, at least about 70 mol. %, at least about 80 mol. %, at least about 90 mol. %, at least about 95 mol. %, at least about 99 mol. % of the recurring units in the PPS are recurring units ($R_{PPS}$) of formula (L) wherein $R_1$ and $R_2$ are hydrogen atoms.

According to an embodiment of the present invention, the PPS polymer is such that about 100 mol. % of the recurring units are recurring units ($R_{PPS}$) of formula (Q'):

(Q')

According to this embodiment, the PPS polymer consists essentially of recurring units ($R_{PPS}$) of formula (Q').

PPS is notably manufactured and sold under the trade name Ryton® PPS by Solvay Specialty Polymers USA, LLC.

Poly(Ether Imide) (PEI)

As used herein, a poly(ether imide) (PEI) denotes any polymer comprising at least 50 mol. %, based on the total number of moles in the polymer, of recurring units ($R_{PEI}$) comprising at least one aromatic ring, at least one imide group, as such and/or in its amic acid form, and at least one ether group.

Recurring units ($R_{PEI}$) may optionally further comprise at least one amide group which is not included in the amic acid form of an imide group.

According to an embodiment, the recurring units ($R_{PEI}$) are selected from the group consisting of following formulas (I), (II), (III), (IV), (V) and mixtures thereof:

(I)

(II)

(III)

(IV)

(V)

wherein:
Ar is a tetravalent aromatic moiety and is selected from the group consisting of a substituted or unsubstituted, saturated, unsaturated or aromatic monocyclic and polycyclic group having 5 to 50 carbon atoms;
Ar' is a trivalent aromatic moiety and is selected from the group consisting of a substituted, unsubstituted, saturated, unsaturated, aromatic monocyclic and aromatic polycyclic group having from 5 to 50 C atoms; and
R is selected from the group consisting of substituted and unsubstituted divalent organic radicals, for example selected from the group consisting of
(a) aromatic hydrocarbon radicals having 6 to 20 carbon atoms and halogenated derivatives thereof;
(b) straight or branched chain alkylene radicals having 2 to 20 carbon atoms;
(c) cycloalkylene radicals having 3 to 20 carbon atoms, and
(d) divalent radicals of formula (VI):

(VI)

wherein:
Y is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —CnF$_{2n}$—
(n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and
R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and
i, for each R", is independently zero or an integer ranging from 1 to 4, with the proviso that at least one of Ar, Ar' and R comprise at least one ether group and that the ether group is present in the polymer chain backbone.

According to an embodiment, Ar is selected from the group consisting of formulas:

(VII)

-continued (VIII)

(IX)

(X)

(XI)

wherein:
X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—; or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

According to an embodiment, Ar' is selected from the group consisting of formulas:

(XII)

(XIII)

(XIV)

(XV)

(XVI)

(XVII)

wherein:
X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—; or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

According to an embodiment of the present disclosure, at least 50 mol. %, based on the total number of moles in the PEI at least 60 mol. %, at least 70 mol. %, at least 80 mol. %, at least 90 mol. %, at least 95 mol. %, at least 99 mol. % or all of the recurring units in the PEI are recurring units (R$_{PEI}$) of formulas (I), (II), (III), (IV), (V) and/or mixtures thereof, as defined above.

According to an embodiment, a poly(ether imide) (PEI) denotes any polymer comprising at least 50 mol. %, based on the total number of moles in the polymer, of recurring units (R$_{PEI}$) of formula (VII):

(XVIII)

wherein
R is selected from the group consisting of substituted and unsubstituted divalent organic radicals, for example selected from the group consisting of
(a) aromatic hydrocarbon radicals having 6 to 20 carbon atoms and halogenated derivatives thereof;
(b) straight or branched chain alkylene radicals having 2 to 20 carbon atoms;

(c) cycloalkylene radicals having 3 to 20 carbon atoms, and (d) divalent radicals of formula (VI):

(VI)

wherein:

Y is selected from the group consisting of alkylenes of 1 to 6 carbon atoms, for example —C(CH$_3$)$_2$— and —C$_n$H$_{2n}$— (n being an integer from 1 to 6); perfluoroalkylenes of 1 to 6 carbon atoms, for example —C(CF$_3$)$_2$— and —C$_n$F$_{2n}$—

(n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and i, for each R", is independently zero or an integer ranging from 1 to 4, with the provisio that at least one of Ar, Ar' and R comprise at least one ether group and that the ether group is present in the polymer chain backbone.

T can either be wherein the divalent bonds of the —O— or the —O—Ar"—O— group are in the 3,3', 3,4', 4,3', or the 4,4' positions,

Ar" is a aromatic moiety selected from the group consisting of a substituted or unsubstituted, saturated, unsaturated or aromatic monocyclic and polycyclic group having 5 to 50 carbon atoms, for example a substituted or unsubstituted phenylene, a substituted or unsubstituted biphenyl group, a substituted or unsubstituted naphtalene group or a moiety comprising two substituted or unsubstituted phenylene.

According to an embodiment of the present disclosure, Ar" is of the general formula (VI), as detailed above; for example, Ar" is of formula (XIX):

(XIX)

The polyetherimides (PEI) used in the present invention may be prepared by any of the methods well-known to those skilled in the art including the reaction of a diamino compound of the formula H$_2$N—R—NH$_2$ (XX), where R is as defined before, with any aromatic bis(ether anhydride)s of the formula (XXI):

(XXI)

where T as defined before.

In general, the preparation can be carried out in solvents, e.g., o-dichlorobenzene, m-cresol/toluene, N,N-dimethylacetamide, at temperatures ranging from 20° C. to 250° C.

Alternatively, these polyetherimides can be prepared by melt polymerization of any dianhydrides of formula (XXI) with any diamino compound of formula (XX) while heating the mixture of the ingredients at elevated temperatures with concurrent intermixing.

The aromatic bis(ether anhydride)s of formula (XXI) include, for example:

2,2-bis[4-(2,3-dicarboxyphenoxy)phenyl]propane dianhydride;

4,4'-bis(2,3-dicarboxyphenoxy)diphenyl ether dianhydride;

1,3-bis(2,3-dicarboxyphenoxy)benzene dianhydride;

4,4'-bis(2,3-dicarboxyphenoxy)diphenyl sulfide dianhydride;

1,4-bis(2,3-dicarboxyphenoxy)benzene dianhydride;

4,4'-bis(2,3-dicarboxyphenoxy)benzophenone dianhydride;

4,4'-bis(2,3-dicarboxyphenoxy)diphenyl sulfone dianhydride;

2,2-bis[4 (3,4-dicarboxyphenoxy)phenyl]propane dianhydride;

4,4'-bis(3,4-dicarboxyphenoxy)diphenyl ether dianhydride;

4,4'-bis(3,4-dicarboxyphenoxy)diphenyl sulfide dianhydride;

1,3-bis(3,4-dicarboxyphenoxy)benzene dianhydride;

1,4-bis(3,4-dicarboxyphenoxy)benzene dianhydride;

4,4'-bis(3,4-dicarboxyphenoxy)benzophenone dianhydride;

4-(2,3-dicarboxyphenoxy)-4'-(3,4-dicarboxyphenoxy)diphenyl-2,2-propane dianhydride; and mixtures of such dianhydrides.

The organic diamines of formula (XX) are chosen from the group consisting of m-phenylenediamine, p-phenylenediamine, 2,2-bis(p-aminophenyl)propane, 4,4'-diaminodiphenyl-methane, 4,4'-diaminodiphenyl sulfide, 4,4'-diamino diphenyl sulfone, 4,4'-diaminodiphenyl ether, 1,5-diaminonaphthalene, 3,3'-dimethylbenzidine, 3,3'-dimethoxybenzidine, and mixtures thereof; preferably, the organic diamines of formula (XX) are chosen from the group consisting of m-phenylenediamine and p-phenylenediamine and mixture thereof.

According to an embodiment, a poly(ether imide) (PEI) denotes any polymer comprising at least 50 mol. %, based on the total number of moles in the polymer, of recurring units (R$_{PEI}$) of formulas (XXIII) or (XXIV), in imide forms, or their corresponding amic acid forms and mixtures thereof:

(XXIII)

(XXIV)

In a preferred embodiment of the present invention, at least 50 mol. %, at least 60 mol. %, at least 70 mol. %, at least 80 mol. %, at least 90 mol. %, at least 95 mol. %, at least 99 mol. % or all of the recurring units in the PEI are recurring units ($R_{PEI}$) of formulas (XXIII) or (XXIV), in imide forms, or their corresponding amic acid forms and mixtures thereof.

Such aromatic polyimides are notably commercially available from Sabic Innovative Plastics as ULTEM® polyetherimides.

In a specific embodiment, the PEI polymer has a weight average molecular weight (Mw) of 10,000 to 150,000 g/mol, as measured by gel permeation chromatography, using a polystyrene standard.

In a specific embodiment, the PEI polymer has an intrinsic viscosity greater than 0.2 deciliters per gram (dl/g), beneficially 0.35 to 0.7 dl/g measured in m-cresol at 25° C.

According to the present invention, the melt flow rate or melt flow index (at 337° C. under a weight of 6.6 kg according to ASTM D1238) (MFR or MFI) of the PEI may be from 0.1 to 40 g/10 min, for example from 2 to 30 g/10 min or from 3 to 25 g/10 min.

In a specific embodiment, the PEI polymer has a Tg ranging from 160 and 270° C., as measured by differential scanning calorimetry (DSC) according to ASTM D3418, for example ranging from 170 and 260° C., from 180 and 250° C.

The polymer composition (C) of the present invention comprises at least one polyamide (P1), and from 1 to 50 wt. %, based on the total weight of (C), of at least one functionalized polymer (P2). According to an embodiment, C comprises at least 10 wt. % of P1, for example at least 20 wt. %, at least 30 wt. %, at least 40 wt. %, at least 50 wt. %, at least 60 wt. %, at least 70 wt. %, at least 80 wt. % or at least 90 wt. % of P1, based on the total weight of C. According to another embodiment, C comprises from 2 to 40 wt. % of P2, for example from 3 to 35 wt. %, from 4 to 30 wt. %, from 5 to 25 wt. % or from 6 to 15 wt. % of P2, based on the total weight of C.

The composition (C) may further comprises at least one polymer (P3) selected from the group consisting of poly(aryl ether sulfone) (PAES), a polyarylene sulfide (PAS), a polyetherimide (PEI). According to an embodiment, C comprises at least 5 wt. % of P3, for example at least 10 wt. %, at least 20 wt. %, at least 30 wt. %, at least 40 wt. %, at least 50 wt. %, at least 60 wt. %, at least 70 wt. %, at least 80 wt. % or at least 90 wt. % of P3, based on the total weight of C. When C comprises both P1 and P3, P1 and P3 may be present in C in a weight ratio P1/P3 ranging from 1/99 to 99/1, for example from 10/90 to 90/10 or from 20/80 to 80/20.

According to an embodiment of the present invention, the polymer composition (C) consists essentially in:
- at least one polyamide (P1),
- from 1 to 50 wt. %, based on the total weight of (C), of at least one functionalized polymer (P2), wherein P2 is a poly(aryl ether sulfone) (PAES) having at least one functional group selected from the group consisting of ($SO_3^-$), ($M^{p+}$)$_{1/p}$ or ($COO^-$), ($M^{p+}$)$_{1/p}$ in which $M^{p+}$ is a metal cation of p valence, and
- optionally at least one polymer (P3) selected from the group consisting of poly(aryl ether sulfone) (PAES), a polyarylene sulfide (PAS), a polyetherimide (PEI).

According to a preferred embodiment, P2 is a functionalized PAES, e.g. PPSU, PSU or PES, and P3 is a PAES e.g. PPSU, PSU or PES. According to this embodiment, P1 is preferably a PPA.

According to an embodiment of the present invention, the composition (C) present domains of an average size of less than 1.0 µm, as measured under transmission electron microscopy (TEM) at a processing temperature of 340° C. during 2 minutes, preferably less than 0.8 or less than 0.6 µm.

According to a preferred embodiment, P2 comprises recurring units of formulas (L1):

(L1)

for example at least 1 mol. %, at least 2 mol. %, at least 3 mol. %, at least 4 mol. %, at least 5 mol. %, at least 10 mol. %, at least 20 mol. %, at least 30 mol. %, at least 40 mol. %, 50 mol. %, at least 60 mol. %, at least 70 mol. %, at least 80 mol. %, at least 90 mol. % or event at least 95 mol. %, based on the total number of moles in the polymer P2. According to this embodiment, P2 may consist essentially in recurring units of formulas L1 and L', as above described.

According to a preferred embodiment, P2 comprises recurring units of formulas (N1):

(N1)

for example at least 1 mol. %, at least 2 mol. %, at least 3 mol. %, at least 4 mol. %, at least 5 mol. %, at least 10 mol. %, at least 20 mol. %, at least 30 mol. %, at least 40 mol. %, 50 mol. %, at least 60 mol. %, at least 70 mol. %, at least 80 mol. %, at least 90 mol. % or event at least 95 mol. %, based on the total number of moles in the polymer P2. According to this embodiment, P2 may consist essentially in recurring units of formulas N1 and N', as above described.

According to another preferred embodiment, P2 comprises recurring units of formulas (O1):

(O1)

for example at least 1 mol. %, at least 2 mol. %, at least 3 mol. %, at least 4 mol. %, at least 5 mol. %, at least 10 mol. %, at least 20 mol. %, at least 30 mol. %, at least 40 mol. %, 50 mol. %, at least 60 mol. %, at least 70 mol. %, at least 80 mol. %, at least 90 mol. % or event at least 95 mol. %, based on the total number of moles in the polymer P2. According to this embodiment, P2 may consist essentially in recurring units of formulas O1 and O, as above described.

Reinforcing Agents

The composition (C) may also comprise at least one reinforcing agent, for example up to 65 wt. % of reinforcing agents, based on the total weight of the composition (C).

The reinforcing agents, also called reinforcing fibers or fillers, may be selected from fibrous and particulate reinforcing agents. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5, at least 10, at least 20 or at least 50.

The reinforcing filler may be selected from mineral fillers (such as talc, mica, kaolin, calcium carbonate, calcium silicate, magnesium carbonate), glass fibers, carbon fibers, synthetic polymeric fibers, aramid fibers, aluminum fibers, titanium fibers, magnesium fibers, boron carbide fibers, rock wool fibers, steel fibers and wollastonite.

Among fibrous fillers, glass fibers are preferred; they include chopped strand A-, E-, C-, D-, S- and R-glass fibers, as described in chapter 5.2.3, p. 43-48 of Additives for Plastics Handbook, 2nd edition, John Murphy. Preferably, the filler is chosen from fibrous fillers. It is more preferably a reinforcing fiber that is able to withstand the high temperature applications.

The reinforcing agents may be present in the composition (C) in a total amount of greater than 25 wt. %, greater than 30 wt. % by weight, greater than 35 wt. % or greater than 40 wt. %, based on the total weight of the polymer composition (C). The reinforcing agents may be present in the composition (C) in a total amount of less than 65 wt. %, less than 60 wt. %, less than 55 wt. % or less than 50 wt. %, based on the total weight of the polymer composition (C).

The reinforcing filler may for example be present in the composition (C) in an amount ranging between 10 and 60 wt. %, for example between 30 and 50 wt. %, based on the total weight of the polymer composition (C).

Optional Components

The composition (C) may also comprises at least one optional component, for example selected from the group consisting of plasticizers, colorants, pigments (e.g. black pigments such as carbon black and nigrosine), antistatic agents, dyes, lubricants (e.g. linear low density polyethylene, calcium or magnesium stearate or sodium montanate), toughener (elastomer), thermal stabilizers, light stabilizers, flame retardants, nucleating agents and antioxidants.

According to an embodiment of the present invention, the composition (C) comprises up to 10 wt. % of at least one optional component, for example from 0.1 to 4 wt. %, from 0.2 to 3 wt. %, from 0.3 to 2.5 wt. % of at least one optional component selected from the group consisting of plasticizer, colorant, pigment, antistatic agent, dye, lubricant, toughener, thermal stabilizer, light stabilizer, flame retardant, nucleating agent and antioxidant.

Preparation of the Functionalized Polymer (P2)

The functionalized polymer (P2) according to the present invention may be an oligomer or polymer, and has at least one functional group, preferably several functional groups. Functional groups can be incorporated by copolymerizing a functional monomer during polymerization of the polymer backbone or by grafting of a pre-formed polymer backbone.

P2 being a PAES, the process for preparing P2 may, for example, comprises a step of condensation of:
- at least one aromatic dihydroxy monomer (a1),
- at least one aromatic sulfone monomer (a2) comprising at least two halogen substituents,
- at least one aromatic monomer (a3), for example an aromatic sulfone monomer, comprising at least one substituent which is a sulfonate —$SO_3^-$, for example ($SO_3^-$), ($M^{p+}$)$_{1/p}$ wherein $M^{p+}$ is a metal cation of p valence. According to an embodiment, the monomer (a3) comprises at least two halogen substituents or two hydroxyl —OH substituents. According to an embodiment, the monomer (a1) comprises, based on the total weight of the monomer (a1), at least 50 wt. % of 4,4'-dihydroxybiphenyl (biphenol), or at least 50 wt. % of 4,4'-dihydroxydiphenyl sulfone or at least 50 wt. % of 2,2-bis(4-hydroxyphenyl)propane (bisphenol A). According to an embodiment, the monomer (a2) is a 4,4-dihalosulfone comprising at least one of a 4,4'-dichlorodiphenyl sulfone (DCDPS) or 4,4'-difluorodiphenyl sulfone (DFDPS), preferably DCDPS. According to an embodiment, the monomer (a3) is a 4,4-dihalosulfone comprising at least one of a 4,4'-dichlorodiphenyl sulfone (DCDPS) or 4,4'-difluorodiphenyl sulfone (DFDPS), preferably DCDPS, comprising at least one substituent which is a sulfonate —$SO_3^-$, as described above. For example, the monomer (a3) is disodium diphenylsulfone-4,4'-dichloro-3,3'-disulfonate or dipotassium diphenylsulfone-4,4'-dichloro-3,3'-disulfonate. The monomers of the reaction mixture are generally reacted concurrently. The reaction is preferably conducted in one stage. This means that the deprotonation of monomer (a1) and the condensation reaction between the monomers (a1), (a2) and (a3) takes place in a single reaction stage without isolation of the intermediate products. According to an embodiment, the condensation is carried out in a mixture of a polar aprotic solvent and a solvent which forms an azeotrope with water. The solvent which forms an azeotrope with water includes aromatic hydrocarbons such as benzene, toluene, xylene, ethylbenzene, chlorobenzene and the like. It is preferably toluene or chlorobenzene. The azeotrope forming solvent and polar aprotic solvent are used typically in a weight ratio of from about 1:10 to about 1:1, preferably from about 1:5 to about 1:1. Water is continuously removed from the reaction mass as an azeotrope with the azeotrope forming solvent so that substantially anhydrous conditions are maintained during the polymerization. The azeotrope-forming solvent, for example, chlorobenzene, is removed from the reaction mixture, typically by distillation, after the water formed in the reaction is removed leaving P2 dissolved in the polar aprotic solvent. The temperature of the reaction mixture is kept at about 150° C. to about 350° C., preferably from about 210° C. to about 300° C. for about one to 15 hours. The inorganic constituents, for example sodium chloride or potassium chloride or excess of base, can be removed, before or after isolation of P2, by suitable methods such as dissolving and filtering, screening or extracting. At the end of its preparation reaction, P2 is separated from the other components (salts, base, . . . ) to obtain a P2 solution. Filtration can for example be used to separate the P2 polymer from the other components. P2 can then be recovered from the solvent, for example by coagulation or devolatilization of the solvent.

Preparation of the Composition (C)

The invention further pertains to a method of making the composition (C) as above detailed, said method comprising melt-blending the polymers P1 and P2, optionally P3, reinforcing agents, and any other components or additives.

Any melt-blending method may be used for mixing polymeric ingredients and non-polymeric ingredients in the context of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing agent presents a long physical shape (for example, a long glass fiber), drawing extrusion molding may be used to prepare a reinforced composition.

Articles

The present invention also relates to the articles comprising the polymer composition (C) of the present invention, described above.

Examples of articles are films, laminates, automotive parts, engine parts, electrical parts and electronics parts.

According to the present invention, the articles manufactured from the polymer composition (C) of the present invention present good mechanical properties after fabrication. They also present a better surface aspect and lower water absorption.

The present invention also relates to a method for manufacturing an article by shaping the composition (C) of the invention. The article can be manufactured according to any shaping technique, such as for example extrusion, injection moulding, thermoform moulding, compression moulding, blow moulding or additive manufacturing like Fused Filament Fabrication (FFF) or Selective Laser Sintering (SLS). The article of the present invention is for example shaped by injection moulding.

Use of the Polymer Composition (C) and Articles

The polymer composition (C) of the present invention can be used to manufacture articles such as under-the-hood technical parts, which need to present a high modulus and strength at elevated temperatures, such as 150° C.

The composition (C), as disclosed above, is accordingly useful in decreasing the weight of articles made from the composition (C).

The present invention also relates to the use of the above disclosed composition (C) for preparing a film, a laminate, an automotive part, an engine part, an electrical part or an electronic part.

Use of the Functionalized Polymer (P2) as a Compatibilizer

The present invention also relates to the use of P2 as a compatibilizer (also called compatibilizing agent) of a composition comprising two immiscible polymers. In the context of the present invention, a "compatibilizer" can be defined as a component significantly reducing the average domain size of a polymeric blend of at least two immiscible polymers. More precisely, the use of P2 in a polymer blend comprising P1, or P1 and P3, significantly reduces the average domains size lower than 1 μm, as shown in the examples and figures below. The present invention thereby also relates to the use of P2 to compatibilize a composition comprising at least two immiscible polymers, wherein the resulting polymer composition presents domains of an average size of less than 1.0 μm, as measured under transmission electron microscopy (TEM) at a processing temperature of 340° C. during 2 minutes. When P2 is used as a compatibilizer of a composition comprising P1 and P3, it is preferably used in a quantity less than 20 wt. %, based on the total weight of the composition, for example less than 15 wt. %, less than 10 wt. %, less than 9 wt. % or even less than 8 wt. %.

Should the disclosure of any patents, patent applications, and publications which are incorporated herein by reference conflict with the description of the present application to the extent that it may render a term unclear, the present description shall take precedence.

EXAMPLES

Raw Materials
P1: PPA Amodel® A8002, commercially available from Solvay Specialty Polymers
P2: Sulfonated PPSU (S-PPSU) containing 5 mol. % of disulfonated repeat units, prepared according to the following process:

In a 4 L four-neck flask fitted with a mechanical stirrer, Dean-Stark trap, condenser and nitrogen inlet, 360 g of 4,4'-biphenol (BP), 559.04 g of 4,4'-dichlorodiphenyl sulfone (DCPDS), 50.34 g of disodium diphenylsulfone-4,4'-dichloro-3,3'-disulfonate (s-DCPPS) and 288.57 g of potassium carbonate ($K_2CO_3$) were placed in 1,806 g of sulfolane. A slight stream of nitrogen was applied above the reaction mixture through one of the necks of the flask with an exit through a bubbler above the condenser. The reaction mixture was stirred with an overhead mechanical agitator and warmed using an oil bath controlled at the appropriate temperature. The bath temperature increased from room temperature to 215° C. over 60 minutes and held at the reaction temperature for 4 hours.

The reaction mixture was cooled down to 150° C., diluted with 1,000 g of sulfolane, further cooled down to 100° C. and filtered.

The PPSU was then recovered by coagulation. The PPSU in sulfolane solution was poured all at the same time into a Waring blender containing a 50/50 v/v mixture of water and methanol, in order to induce precipitation. The resulting off-white solid was then isolated by filtration, and washed three times in the Waring blender with hot deionized water (70° C.) and twice with methanol with filtration between each wash. The GPC in DMF gave Mn=1 3,838, Mw=33, 247 g/mol.

P3: PPSU Radel® R-5600, commercially available from Solvay Specialty Polymers

Glass fibers OCV983, commercially available from Owens Corning Vetrotex

Melt Extrusion

Different formulations were prepared, as detailed in Tables 1 and 2.

Each formulation was melt compounded using a 26 mm diameter Coperion® ZSK-26 co-rotating partially intermeshing twin screw extruder having an L/D ratio of 48:1. The barrel sections 2 through 12 and the die were heated to set point temperatures as follows:
Barrels 2-9: 340° C.
Barrels 10-12: 320° C.
Die: 360° C.
The melt temperature reached about 340° C.

In each case, the resin blends were fed at barrel section 1 using a gravimetric feeder at throughput rates in the range 30-35 lb/hr. The extruder was operated at screw speeds of around 200 RPM. Vacuum was applied at barrel zone 10 with a vacuum level of about 27 inches of mercury. A single-hole die was used for all the compounds to give a filament approximately 2.6 to 2.7 mm in diameter and the polymer filament exiting the die was cooled in water and fed to the pelletizer to generate pellets approximately 2.7 mm in length. Pellets were dried at 140° C. for 16 h under vacuum prior injection molding (IM, comparative examples).

Injection molding was used to produce tensile ASTM type I bars and ASTM flex bars in a mold regulated at 155° C.

Test Methods

Tensile properties properties (ASTM D638) and impact strength izod (ASTM D256) are reported in the tables.

Water absorption study was done by soaking bars in dionized water at room temperature. Before being soaked in water, the weight of the bar is w(t0). To measure the water absorption at a time (t), the bars are removed from water and the weight w(t) is quickly measured and the water absorption is calculated using the formula (w(t)−w(t0))/w(t0)).

TABLE 1

|  | Comparative Example 1 | Example 1 |
|---|---|---|
| P1(PPA) | 70 | 70 |
| P3 (PPSU) | 30 | 25 |
| P2 (s-PPSU) | — | 5 |
| Water absorption (%) |  |  |
| After 2 days | 0.66 | 0.63 |
| After 5 days | 0.89 | 0.77 |
| After 9 days | 1.18 | 0.95 |
| After 21 days | 1.61 | 1.29 |
| After 30 days | 1.90 | 1.55 |

Both compositions of Example 1 and Comparative example 1 have a higher storage modulus (180 MPa) at 180° C. compared to neat Amodel® A8002 (100 MPa) (results not presented here), thanks to the presence of PPSU (Tg=220° C.).

Despite the hydrophilic nature of the s-PPSU, the composition of example 1 also surprisingly shows lower water absorption, in comparison to the composition of comparative example 1.

Figure 1A:
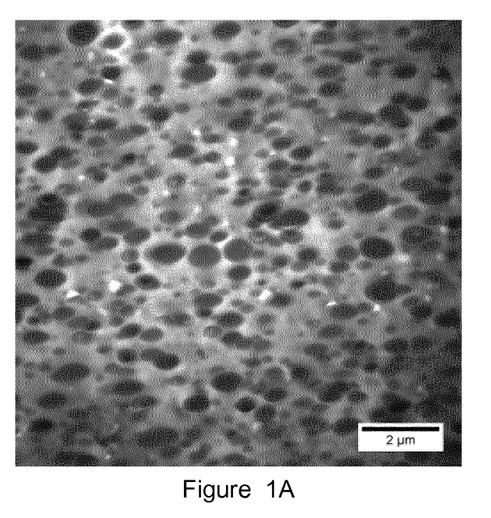
Figure 1B:
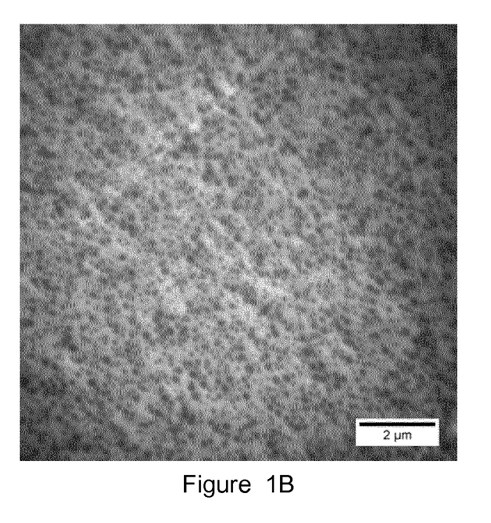

The transmission electron microscopy (TEM) micrographs of the compositions of Comparative Example 1 (FIG. 1A) and Example 1 (FIG. 1B) also show a significant reduction in the domain size when s-PPSU is present in the composition. S-PPSU acts as a compatilizer in the blend PPA/PPSU by reducing the size of the dispersed phase to less than 200 nm (FIG. 1B).

TABLE 2

|  | Comparative Example 2 | Example 2 |
|---|---|---|
| P1 | 49 | 49 |
| P3 (PPSU) | 21 | 17.5 |
| P2 (s-PPSU) | — | 3.5 |
| Glass fibers | 30 | 30 |
| Surface aspect* | − | + |
| Impact strength - notched IZOD (ft-lb/in) | 1.10 | 1.36 |
| Impact strength - unnotched IZOD (ft-lb/in) | 12.0 | 14.5 |
| Tensile modulus (GPa) | 10.5 | 10.5 |
| Tensile strength at break (MPa) | 174.4 | 180.6 |
| Tensile elongation at break (%) | 2.1 | 2.2 |

+ homogeneous surface,
− heterogeneous surface

As far as the surface aspect is concerned, while the surface of the bars prepared with the composition of Comparative Example 2 presents some non-compatible zones, with some streaks appearing occasionally at the surface, the surface of the bars prepared with the composition of Example 2 is homogeneous.

The mechanical properties of the composition of Example 2 are also globally improved, in comparison to the same composition comprising no s-PPSU.

Overall, the addition of a s-PPSU in a composition comprising PPA, PPSU and GF improves the compatibility, reduces the water absorption and improves the surface aspect of the blends PPA/PPSU/GF.

The invention claimed is:

1. A polymer composition (C), comprising:
   at least one polyamide (P1), wherein P1 is a condensation product of a mixture comprising at least one diamine and at least one diacid, and
   from 1 to 50 wt. %, based on the total weight of (C), of at least one functionalized polymer (P2), wherein P2 is a poly(aryl ether sulfone) (PAES) having at least one functional group selected from $(SO_3^-)(M^{p+})_{1/p}$; $(COO^-)(M^{p+})_{1/p}$; or both, in which $M^{p+}$ is a metal cation of p valence.

2. The composition (C) of claim 1, further comprising at least one polymer (P3) selected from the group consisting of poly(aryl ether sulfone) (PAES), a polyarylene sulfide (PAS), and a polyetherimide (PEI).

3. The composition (C) of claim 2, wherein P2 and/or P3 is a PAES selected from the group consisting of a poly(biphenyl ether sulfone) (PPSU), a polyethersulfone (PES) and a polysulfone (PSU).

4. The composition (C) of claim 1, comprising, based on the total weight of (C):
   from 10 to 89 wt. % of the at least one polyamide (P1),
   from 1 to 50 wt. % of the at least one functionalized polymer (P2), and
   up to 89 wt. % of at least one polymer (P3) selected from the group consisting of poly(aryl ether sulfone) (PAES), a polyarylene sulfide (PAS), and a polyetherimide (PEI).

5. The composition (C) of claim 1, wherein P1 is an aromatic polyamide (PPA) comprising at least 50 mol. % of recurring units resulting from the condensation of:
   at least one phthalic acid (DA), or derivative thereof, and
   at least one aliphatic diamine (NN).

6. The composition (C) of claim 1, presenting domains of an average size of less than 1.0 μm, as measured under transmission electron microscopy (TEM) at a processing temperature of 340° C. and a processing time of 2 minutes.

7. The composition (C) of claim 1, comprising, based on the total weight of the composition (C):
   from 10 to 89 wt. % of the at least one polyamide (P1),
   from 1 to 50 wt. % of the at least one functionalized polymer (P2), which is a poly(aryl ether sulfone) (PAES) comprising at least one functional group selected from the group consisting of $SO_3^-$, $Na^+$; $SO_3^-$, $K^+$; $COO^-$, $Na^+$; and $COO^-$, $K^+$, and
   up to 89 wt. % of at least one polymer (P3) which is a poly(aryl ether sulfone) (PAES).

8. The composition (C) of claim 1, further comprising at least one additive (A) selected from the group consisting of reinforcing agents, plasticizers, colorants, pigments, antistatic agents, dyes, lubricants, thermal stabilizers, light stabilizers, flame retardants, nucleating agents and antioxidants.

9. An article comprising the polymer composition of claim 1.

10. The article of claim 9, which is a film, a laminate, an automotive part, an engine part, an electrical part or an electronic part.

11. A method for increasing compatibility of a polymer composition (C) comprising at least two immiscible polymers:
   at least one polyamide (P1), wherein P1 is a condensation product of a mixture comprising at least one diamine and at least one diacid, and
   at least one polymer (P3) selected from the group consisting of poly(aryl ether sulfone) (PAES), a polyarylene sulfide (PAS), and a polyetherimide (PEI),
   said method comprising using a functionalized polymer (P2) as a compatibilizer in the polymer composition (C),
   wherein the functionalized polymer (P2) is a poly(aryl ether sulfone) (PAES) having at least one functional group selected from $(SO_3^-)(M^{p+})_{1/p}$; $(COO^-)(M^{p+})_{1/p}$; or both, in which $M^{p+}$ is a metal cation of p valence.

12. The method according to claim 11, wherein the polymer composition (C) comprises, based on the total weight of the composition (C):
   from 1 to 98 wt. % of P1,
   from 1 to 98 wt. % of P3,
   from 1 to 40 wt. % of P2,
   optionally at least one additive selected from the group consisting of reinforcing agents, plasticizers, colorants, pigments, antistatic agents, dyes, lubricants, thermal stabilizers, light stabilizers, flame retardants, nucleating agents and antioxidants.

* * * * *